United States Patent
Lim

(10) Patent No.: US 9,933,538 B2
(45) Date of Patent: Apr. 3, 2018

(54) ADAPTIVE OPTIMIZATION OF OUTPUT POWER, WAVEFORM AND MODE FOR IMPROVING ACOUSTIC TOOLS PERFORMANCE

(71) Applicant: Halliburton Energy Services, Inc., Houston, TX (US)

(72) Inventor: Chin Wee Lim, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 167 days.

(21) Appl. No.: 15/034,487

(22) PCT Filed: Dec. 5, 2013

(86) PCT No.: PCT/US2013/073265
§ 371 (c)(1),
(2) Date: May 4, 2016

(87) PCT Pub. No.: WO2015/084361
PCT Pub. Date: Jun. 11, 2015

(65) Prior Publication Data
US 2016/0291188 A1    Oct. 6, 2016

(51) Int. Cl.
*G01V 1/46* (2006.01)
*G01V 1/48* (2006.01)
(Continued)

(52) U.S. Cl.
CPC ............... *G01V 1/48* (2013.01); *E21B 47/12* (2013.01); *E21B 47/18* (2013.01); *E21B 49/00* (2013.01);
(Continued)

(58) Field of Classification Search
CPC ............... G01V 1/46; G01V 1/48; G01V 1/72
(Continued)

(56) References Cited

U.S. PATENT DOCUMENTS 5,134,285 A     7/1992   Perry et al.
5,148,408 A *   9/1992   Matthews ............... E21B 47/16
                                                    367/82
(Continued)

FOREIGN PATENT DOCUMENTS

WO   2004/063772 A1    7/2004
WO   2012/144981 A1    10/2012
WO   2013/151531 A1    10/2013

OTHER PUBLICATIONS

Llorente, Carlos, et al. "LWD Bimodal Acoustic Tool Delivers Full Range of Sonic-Wave Arrivals," SPE 139284 Paper, SPE Latin American and Caribbean Petroleum Engineering Conference. Society of Petroleum Engineers, 2010.
(Continued)

*Primary Examiner* — Ian J Lobo
(74) *Attorney, Agent, or Firm* — John W. Wustenberg; Baker Botts L.L.P.

(57) ABSTRACT

A method and system for enhancing the signal quality of received signals generated by acoustic tools by factoring in feedbacks from the rig operations in an adaptive optimization process. The system may include a transmitter driver circuit and transmitters which can implement signal transmission at selected power, mode and waveforms. The selected power, mode and transmit waveforms may further be generated in the system by making optimal calculations based on realtime information from the downhole data regarding the formation and borehole characteristics.

21 Claims, 5 Drawing Sheets

(51) Int. Cl.
    *E21B 47/12*     (2012.01)
    *E21B 47/18*     (2012.01)
    *E21B 49/00*     (2006.01)

(52) U.S. Cl.
    CPC ............ *G01V 1/46* (2013.01); *G01V 2200/14* (2013.01); *G01V 2200/16* (2013.01); *G01V 2210/1299* (2013.01); *G01V 2210/1429* (2013.01); *G01V 2210/32* (2013.01); *G01V 2210/6169* (2013.01); *G01V 2210/6222* (2013.01)

(58) Field of Classification Search
    USPC .......................................................... 367/25
    See application file for complete search history.

(56) References Cited

U.S. PATENT DOCUMENTS

| | | |
|---|---|---|
| 5,924,499 A | 7/1999 | Birchak et al. |
| 6,021,377 A | 2/2000 | Dubinsky et al. |
| 6,088,294 A | 7/2000 | Leggett et al. |
| 6,850,068 B2 | 2/2005 | Chemali et al. |
| 7,823,658 B2 | 11/2010 | Hartmann et al. |
| 2010/0039898 A1 | 2/2010 | Gardner et al. |
| 2010/0097887 A1 | 4/2010 | Patterson et al. |
| 2010/0290312 A1 | 11/2010 | Domnanish et al. |
| 2012/0298420 A1 | 11/2012 | Seydoux et al. |
| 2013/0063276 A1 | 3/2013 | Zientarski |
| 2015/0030165 A1* | 1/2015 | Risberg ................ H04R 29/001 381/58 |

OTHER PUBLICATIONS

Schlumberger Sonicvision Brochure found at https://www.slb.com/~/media/Files/drilling/brochures/lwd/vision/sonicvision.pdf, 7 pages.
International Search Report and Written Opinion issued in related PCT Application No. PCT/US2013/073265 dated Sep. 2, 2014, 9 pages.
"Downhole logging tools: Triple Combo Tool String—Accelerator Porosity Sonde (APS)" found at http://iodp.ldeo.columbia.edu/TOOLS_LABS/TRIPLE/aps.html, 3 pages.
Barnett, Craig, "Measure P-, S-Waves While Drilling", Exploration & Production, vol. 73, No. 5, pp. 101-102.
International Preliminary Report on Patentability issued in related Application No. PCT/US2013/073265, dated Jun. 16, 2016 (7 pages).

* cited by examiner

ADAPTIVE OPTIMIZATION OF OUTPUT POWER, WAVEFORM AND MODE FOR IMPROVING ACOUSTIC TOOLS PERFORMANCE

CROSS-REFERENCE TO RELATED APPLICATIONS

The present application is a U.S. National Stage Application of International Application No. PCT/US2013/073265 filed Dec. 5, 2013, which is incorporated herein by reference in its entirety for all purposes.

BACKGROUND

Hydrocarbons, such as oil and gas, are commonly obtained from subterranean formations. Although acoustic logging tools are generally known for monitoring and obtaining downhole formation characteristics, different downhole conditions in drilling affects the quality of signals received at the different receivers of the acoustic tools. Acoustic tools may be used to collect information from various drilling operations. Generally, a drilling operation conducted at a wellsite requires that a wellbore be drilled that penetrates the hydrocarbon-containing portions of the subterranean formation. Typically, subterranean operations involve a number of different steps such as, for example, drilling the wellbore at a desired well site, treating the wellbore to optimize production of hydrocarbons, and performing the necessary steps to produce and process the hydrocarbons from the subterranean formation.

The performance of various phases of subterranean operations involves numerous tasks that are typically performed by different subsystems located at the well site, or positioned remotely therefrom. One of these different steps may involve the use of an acoustic tool for measuring various parameters. Generally, for operation of a wellsite, formation characteristics may provide information for downhole conditions.

Traditionally, acoustic tools operate at predefined waveforms of certain frequencies, operating mode (monopole, dipole, quadrupole or crossed dipole) and output power. An acoustic logging tool typically includes an acoustic source, and a set of receivers spaced apart by a preset length. An acoustic signal is transmitted by the acoustic source and received at the receivers of the borehole tool which are spaced apart from the acoustic source. Measurements are repeated at predefined periods or depths as the tool passes along the borehole.

The acoustic signal from the acoustic tools travels through the formation adjacent the borehole to the receiver. Typically, compressional wave, shear wave, and other waves are detected by the receivers and are processed. The processing of the data may be performed on the surface or in real time in the tool. This information is typically used to determine formation characteristics from which pore pressure, porosity, and other formation property determinations can be made.

Acoustic logging tools are used for both wireline logging and logging-while-drilling (LWD) applications. In wireline logging, a probe, or "sonde", housing multiple logging tools is lowered into the borehole after some or all of the well has been drilled. The sonde is attached to a conductive wireline that carries power from the surface to the tools in the sonde, and that carries telemetry information to the surface. Power is generally acquired through a power supply or by some other means to generate a signal with sufficient intensity to be detected at the receivers.

Acoustic logging tools may also require a source waveform. Several different types of acoustic logs may be generated based on the source waveform. The source waveform may be based on the frequencies applied to the waveform for use by the acoustic logging tools. Several types of logs may be generated using the source waveform (which may be in the form of wavelets, chirp waves or sine waves), including compressional and shear velocities, and more.

Typically, the amount of power, operating mode and the waveforms to be applied for the acoustic logging while drilling (LWD) tool is fixed before going downhole. The resulting measurement results in signals based on power, mode and waveforms, that generate a formation response and characteristics of the downhole environment. Quality of the received signals is important for signal processing to get accurate downhole formation characteristics. The quality of the signals received from downhole may be attenuated due to the formation characteristics of the downhole environment, the mud pulse or other method of transmission of the data, the mud flow, the size of the borehole, and tool eccentering, among other factors.

The quality of the signals received also depends on the input to the acoustic logging tools. Certain power, operating mode and waveform input are provided to the acoustic logging tool. Despite the changes in formation characteristics and the various attenuation factors listed above, the power, operating mode and waveform applied to the acoustic tool remain fixed. This results in signals received from the acoustic logging tools that may not be using the most efficient input to generate the signals. As measurements continue downhole, the applied power, operating mode and waveform may result in signals that are not effective and may need to be varied to improve the accuracy of the formation characteristics. However, all of these require significant time and effort, including requiring the need for removing the drilling assembly to reprogram the various variables for the acoustic logging tools. This can be both time-consuming and extremely costly, especially in situations where a substantial portion of the well has been drilled. There may also be improved source wave forms that may be available based on the environmental conditions.

Prior methods to vary the power, mode and waveforms applied to the acoustic logging tool including varying the source waveform pose significant problems. Other systems have proposed using a variety of waveforms by adapting the frequencies, but this results in over-measurement of data and still does not use the environmental conditions to factor in optimizing the input variables for the acoustic tools. Still other systems have suggested using a high output transmitted power to receive and improve the signal quality from the acoustic logging tool. However, higher power affects the signal-to-noise ratio of the received signal via higher tool mode noise. Moreover, it is undesirable to have a high power transmitter as the power must be provided by a power supply downhole, where space for such tools is already limited. Though having additional power can address the quality of the signal, it is undesirable because it will reduce the tool downhole operating time, time that the tool can remain downhole performing logging operations, to an undesirable period. Transmission waveform is also an important factor in acoustic logging tools as different formations have a different resonance and may require a different waveform of other frequencies to be used. This transmit waveform may not be easy to decide until measurements from downhole characteristics have been received. Typically, it is desirable to transmit near the resonance frequency of the formation to reduce signal attenuation. In fast formations (where the shear velocity is faster than the mud velocity), we can measure refracted shear velocities due to Snell's law. However, when the shear is slower (or very close) than the mud, we cannot measure refracted shear and must rely on borehole modes such as Stoneley, flexural, or quadrupole to infer the shear velocity. The various modes for acquisition of these borehole modes by the acoustic logging tool are monopole, dipole, quadrupole and crossed dipole mode.

Accordingly, there is a need for an adaptive controller that can adapt the various power, mode and transmit waveform based on feedback from the downhole environment.

Figure 1:
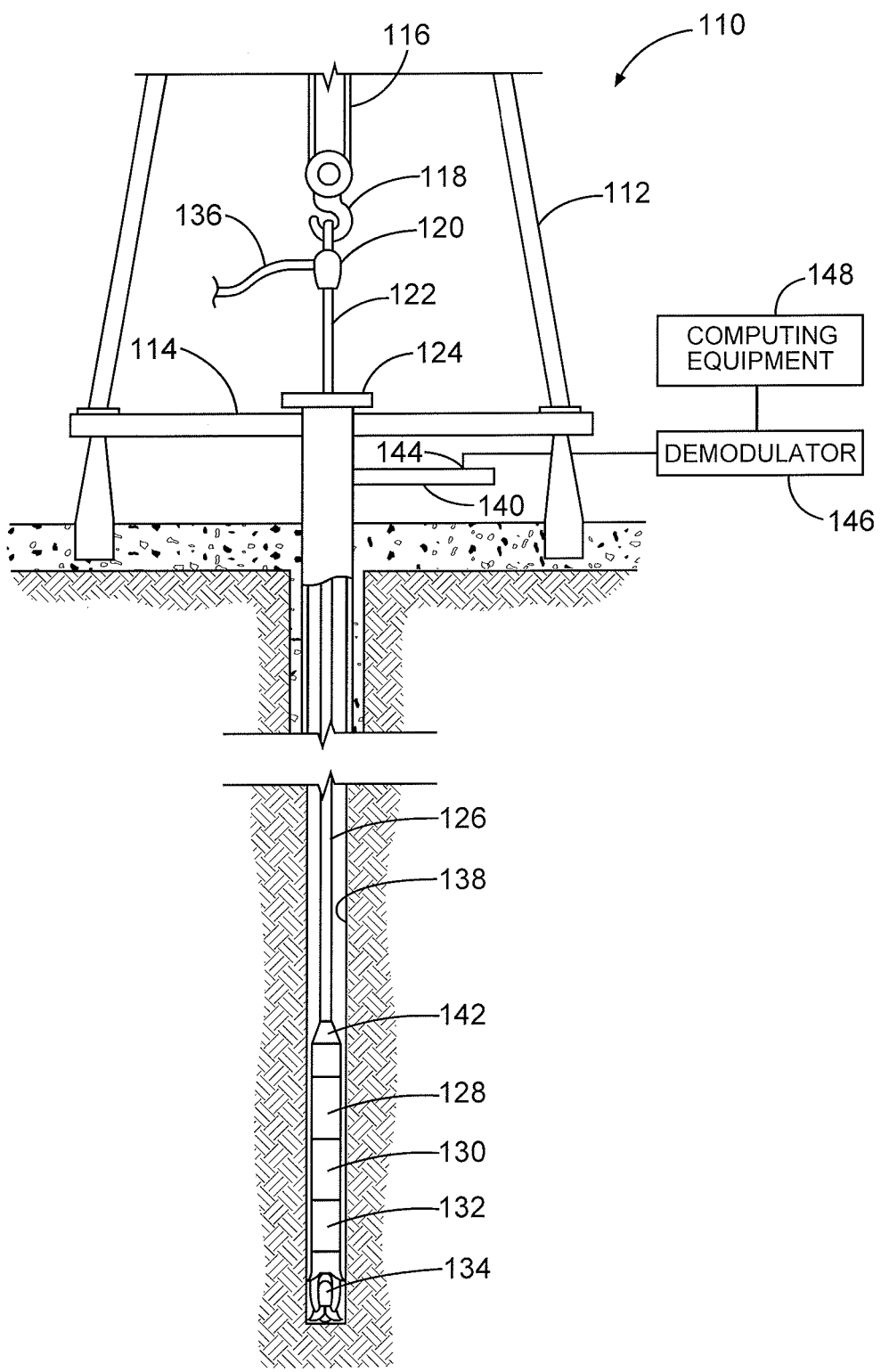
FIG. 1 shows an illustrative system for performing drilling operations.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. Devices and methods in accordance with certain embodiments may be used in one or more of measurement-while-drilling (MWD) and logging-while-drilling (LWD) operations. "Measurement-while-drilling" is the term generally used for measuring conditions downhole concerning the movement and location of the drilling assembly while the drilling continues. "Logging-while-drilling" is the term generally used for similar techniques that concentrate more on formation parameter measurement.

The terms "couple" or "couples," as used herein are intended to mean either an indirect or direct connection. Thus, if a first device couples to a second device, that connection may be through a direct connection, or through an indirect electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

The present invention is directed to improving the qualities of the signals received from acoustic logging tools, and more specifically, to a method and system for enhancing signal qualities, which results in enhancing processed data accuracy, by providing an optimum transmission power, mode and transmit waveform.

As shown in FIG. 1, a drilling rig 110 (simplified to exclude items not important to the present application) may comprise a derrick 112, a derrick floor 114, a draw works 116, a hook 118, a swivel 10, a kelly joint 122, a rotary table 124, a drillstring 126, a drill collar 128, a logging-while-drilling (LWD) tool 130, a logging-while-drilling (LWD) acoustic logging tool 132, and a drill bit 134. Mud may be injected into the swivel by a mud supply line 136. The mud may travel through a mud supply line 136, the kelly joint 122, the drill-string 126, the drill collar 128, and the logging-while-drilling (LWD tools 130 and 132, and may exit through ports in the drill bit 134. The mud may then flow up a borehole 138. A mud return line 140 may return mud from the borehole 138 and may circulate the mud to a mud pit (not shown) and back to the mud supply line 136.

The data collected by the logging-while-drilling (LWD) tools 130 and 132 may be returned to the surface for analysis by telemetry transmitted through the drilling mud. A telemetry transmitter 142 located in the drill collar 128 or in one of the logging-while-drilling (LWD tools 130 and 132 may collect data from the logging-while-drilling (LWD) tools 130 and 132 and may modulate the data onto a carrier that can be transmitted through the mud. A telemetry sensor 144 on the surface may detect the telemetry and may return the telemetry to a demodulator 146. The demodulator 146 may demodulate the data and may provide the data to computing equipment 148 where the data may be analyzed to extract useful geological information. It is well-known to those skilled in the art, having the benefit of the present disclosure, that knowledge of parameters, i.e., density, compressional velocity, and shear velocity, can yield the physical parameters that can fully characterize the mechanical properties of the rock. The density measurement can be performed with several classical nuclear methods. The measurement of the compressional and shear velocity can only happen with acoustic means, i.e., through the calculation of acoustic velocities. In logging applications, it is customary to discuss the subject in terms of "interval travel times," or "acoustic transit times," which is the reciprocal of the acoustic velocities.

Figure 2:
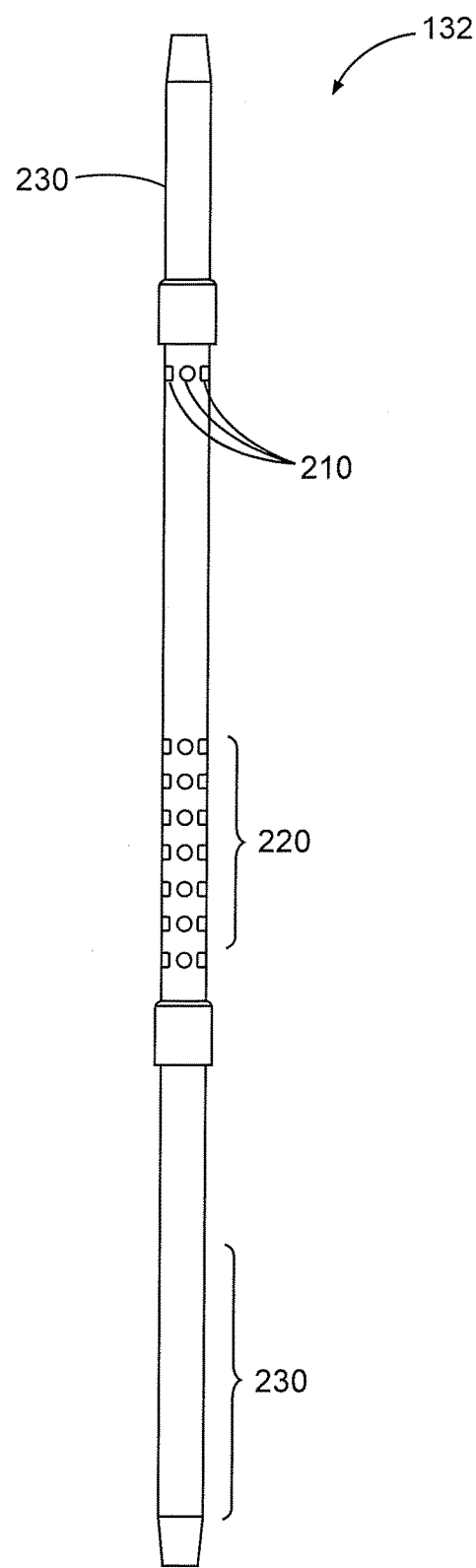
FIG. 2 shows a preferred embodiment of the system in accordance with an exemplary embodiment of the present invention.

FIG. 2 shows a preferred embodiment of the acoustic logging tool 132 in accordance with an exemplary embodiment of the present invention. FIG. 2 illustrates a logging-while-drilling (LWD) acoustic logging tool 132. The exemplary acoustic logging tool 132 has a quadrupole-capable transmitter and a quadrupole-capable receiver. The logging-while-drilling (LWD) acoustic logging tool 132 includes four transmitters 210 (only three are shown) and four rows of seven receivers 220 (only three rows are shown). The four transmitters 210 and four rows of seven receivers 220 can be manipulated to create a quadrupole-capable transmitted and receiver set. Other than quadrupole capable, the acoustic logging tool 132 is also capable of performing monopole and dipole operations.

The acoustic logging tool 132 may further include an electronics section 230 to control the acquisition of the waveform data and communication with the surface. The signals from each of the receivers 220 are preferably digitized using high resolution as known in the art analog-to-digital converters (ADC) and transmitted to the surface. The four transmitters 210 are operable to provide acoustic signals into the formation surrounding the wellbore and the receiver 220 can receive signals reflected from the wellbore in response to the transmitted signals from the transmitters 210.

In one aspect, the transmitter 210 may transmit signals at frequencies at which the transmitted signals are refracted or reflected by the wellbore wall and received by the receivers 220. In one aspect, the transmitter and receiver may be coupled as one device such as a transducer for standoff measurement (not shown).

Still referring to FIG. 2, the tool 132 further includes electronic circuit 230 configured to, among other things, control the transmission of the acoustic signals into the formation, control amplification of the received acoustic signals, and process the signals received by the receivers 220. The electronic circuit 230, in one aspect, includes a transmitters driver circuit 341 described in more detail in reference to FIG. 3, a transmitter control module 340, a digital signal processor 350, a data storage device 331 (such as flash or solid state memory) and programs accessible to the main processor 330 so that the processor may execute instructions contained in the programs. The main processor 330 also may communicate with the surface processor 148 via a suitable telemetry line. The telemetry line may further be communicatively coupled along a data bus 320 or via a telemetry tool. The frequency of the signal may be determined by the electronic circuit 230.

Figure 3:
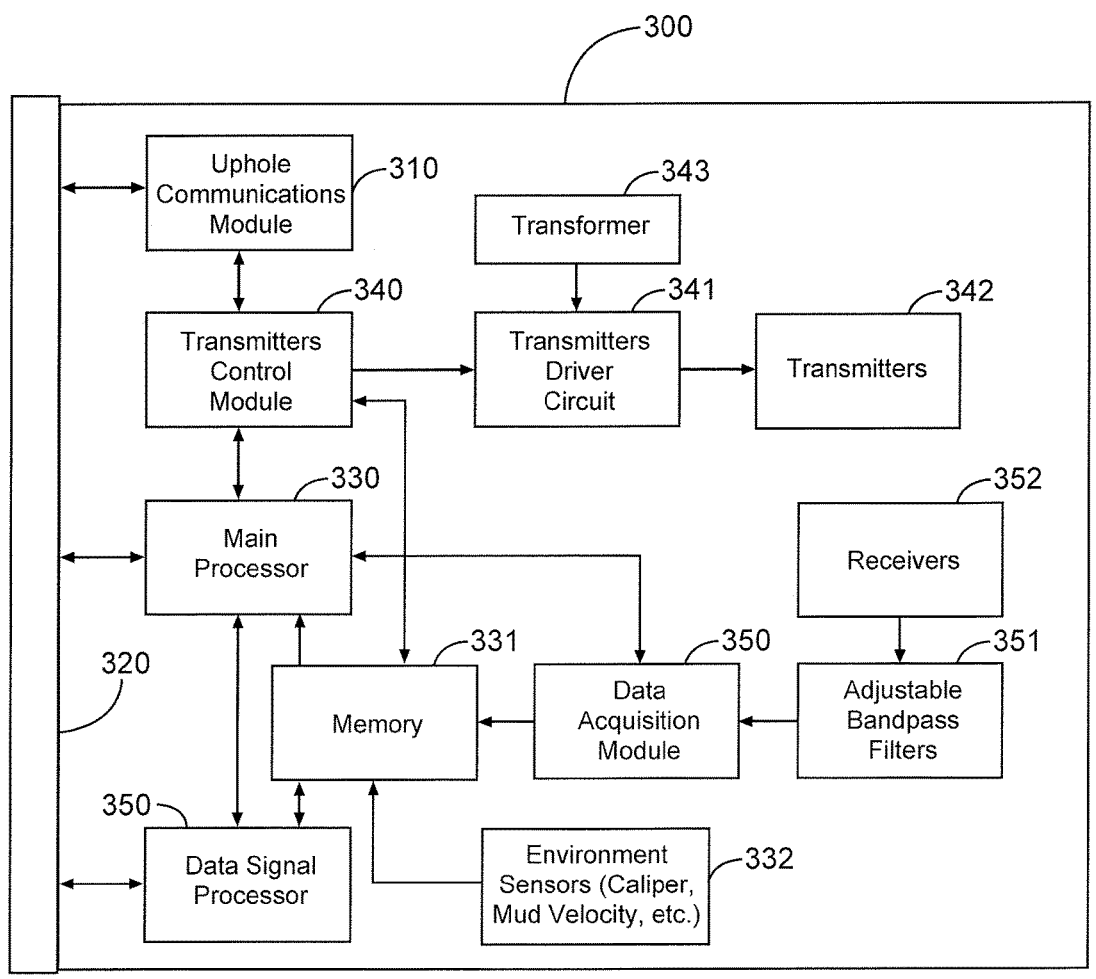
FIG. 3 shows an exemplary embodiment of a functional diagram of the acoustic logging tool in accordance with an exemplary embodiment of the present invention.

FIG. 3 shows a simplified functional diagram of the acoustic logging tool in accordance with an exemplary embodiment of the present invention. These control electronics are an embodiment of the acoustic tool that may be used to implement the present invention. The receivers 352 receive signals affected by formation and environment, and send them to the adjustable bandpass filters 351 in the form of electrical analogue signals. The adjustable bandpass filter 351 passband parameters like center frequency and bandwidth are adjusted with referenced to the previous transmitted source waveforms frequencies. The filtered analogue signals from each of the receiver transducers are preferably digitized using high resolution (e.g. 18 bit) analog-to-digital converters at the data acquisition module 350 and stored in memory 331. The data acquisition module 350 will communicate to the main processor 330 when received data are ready to be processed. The main processor 330 will send a request for the digital signal processor 350 to process the data from each receiver arrays 352. Digital signal processor 350 will proceed to extract the data from the memory 331 and process each receiver array data to compute the formation characteristics and various signal qualities. The computed information is stored back in the memory 331. The main processor 330 may be able to provide data to an uphole communications module 310. Computing equipment 148 (FIG. 1) can communicate with the main processor 330 to read and change operating parameters and the software algorithms. The main processor 330 may further be communicatively coupled to a transmitters control module 340. The transmitters control module 340 may be further communicatively coupled to a transmitters driver circuit 341. The transmitters driver circuit 341 may be further communicatively coupled to a transformer 343 capable of providing power. A transformer 343 may further supply the power to the transmitters driver circuit 341. The transmitters driver circuit 341 will also consist of adjustable bandpass filters for smoothening of the transmit signal at different transmitters. The transmitters control module 340 and the transmitters driver circuit 341 are capable of generating a signal at a selected power, mode, and waveform to be transmitted to the formation via the transmitters 342. After the received data from the previous transmission are processed by the digital signal processor 350, the main processor 330 will request the transmitters control module 340 to initiate signal optimization. The transmitters control module 340 may be an adaptive controller that enables the selection of a power, mode, and waveform for next transmission of a desired optimized acoustic signal, using previous processed data including the formation characteristic and signal qualities. The transmitters control module 340 may select and download the optimum waveform from memory 331 and generate an electrical signal, performed by a Digital-to-Analogue Convertor (DAC) (not pictured), for each different transmitters. The signals may further be sent to the transmitters driver circuit 341, that forms a part of the main electronics 230 for the acoustic logging tool. The transmitters driver circuit may use known software techniques to transmit the optimized source waveforms at the optimized power and mode. The source waveforms and power may be varied based on feedback of the parameters of the wellbore as discussed further below. By using the software techniques to transmit specific power, mode, and waveform at a desired rate, the method and system of the present invention allows for a large range of output power, mode, and waveform for use for generating the acoustic signal. By varying the acoustic signals based on feedback parameters, signal qualities can be improved and the impact of attenuation can be reduced in the received signal, resulting in higher signal-to-noise (SNR) ratio and more accurate formation measurements. In one embodiment, acoustic signals may be generated by transmitters sending signals onto the formation, and arrays of receivers receiving these transmissions.

Another approach to implement acoustic signal transmission at a selectable power, mode, and waveform may include hardware control via multiplexers. The transmitters driver circuit 341 may include several drivers with each driver able to drive each different transmitter at a different power. The selected driver may be electrically connected to the transmitter via a mechanical multiplexor circuit, in one embodiment, in the form of a high power single pole with multiple throw relay. In addition, the transmitter driver circuit 341 is communicatively coupled to the transmitters control module 340 which generates the optimized output waveform.

Other embodiments may also be used to implement signal transmission at a selected power, mode and waveforms and this disclosure is not intended to limit any such application and is merely exemplary of two of several approaches.

The selection of the optimum power and frequency by the transmitter driver circuit 260 may be performed by algorithms such as a fuzzy classification algorithm, artificial neural network, expert system, or lookup table known to a person of ordinary skill in the art. The present invention relates to using the feedback from the downhole parameters to determine an optimum output power and frequency to be used on the next acoustic signal transmission.

The information needed to optimize the power, mode, and waveform comes from the downhole environment on a feedback based on the downhole measurements of the downhole parameters. The feedback from the downhole environment can be in the form of data. The data from the downhole environment may be received by telemetry sensors or other sensors (not shown) in the downhole environment. The sensors may be coupled to appropriate data encoding circuitry, such as an encoder, which sequentially produces encoded digital data electrical signals representative or the measurements obtained by sensors. While other sensors are not shown, one skilled in the art will understand that a smaller or larger number of sensors may be used without departing from the scope of the present invention. The sensors may be selected to measure downhole parameters including, but not limited to, environmental parameters, directional drilling parameters, and formation evaluation parameters. Such parameters may include downhole pressure, downhole temperature, the resistivity or conductivity of the drilling mud and earth formations, the density and porosity of the earth formations, as well as the orientation of the wellbore. Sensor examples include, but are not limited to a resistivity sensor, a nuclear porosity sensor, a nuclear density sensor, a magnetic resonance sensor, a pressure sensor, a mud velocity sensor, a temperature sensor, borehole caliper, a standoff sensor, and an azimuthal sensor package. Additionally, formation fluid samples and/or core samples may be extracted from the formation using formation tester. Such sensors and tools are known to those skilled in the art. In an embodiment, the sensors may be based on a standard hardware interface that could add new sensors for measuring new metrics at the rigsite in the system.

Data representing sensor measurements of the parameters may be generated, stored, and transmitted to the computing equipment 148. Data may be provided through mud pulse telemetry or by other means to the surface. Alternatively, other types of telemetry signals may be used for transmitting data from downhole to the surface. These include, but are not limited to, electromagnetic waves through the earth and acoustic signals using the drill string as a transmission medium. In yet another alternative, drill string may include wired pipe enabling electric and/or optical signals to be transmitted between downhole and the surface. The data may be used, for example, to change downhole operating parameters.

Any suitable processing application package may be used by the computing equipment 148 to process the parameters. In one embodiment, the software produces data that may be presented to the operational personnel in a variety of visual display presentations such as a display. For example, the measured-value set of parameters may be juxtaposed to the expected-value set of parameters using the display, allowing the user to manually identify, characterize, or locate a downhole condition. The sets may be presented to the user in a graphical format or in a textual format. The sensors are only illustrative and are not intended to limit the scope of the invention. Sensors may also include Halliburton directional sensors, for example, DM (Directional Module), PCD (Pressure Case Directional) and PM3 (Position Monitor). Other sensors may include the azimuthal deep resistivity (ADR) sensors, the azimuthal focus resistivity (AFR) sensors, and the IXO, included within the package of sensors. The data from the sensors may be used as further discussed below in identifying the optimum power and frequency to be used on the next transmission of data, as further discussed below.

Figure 4:
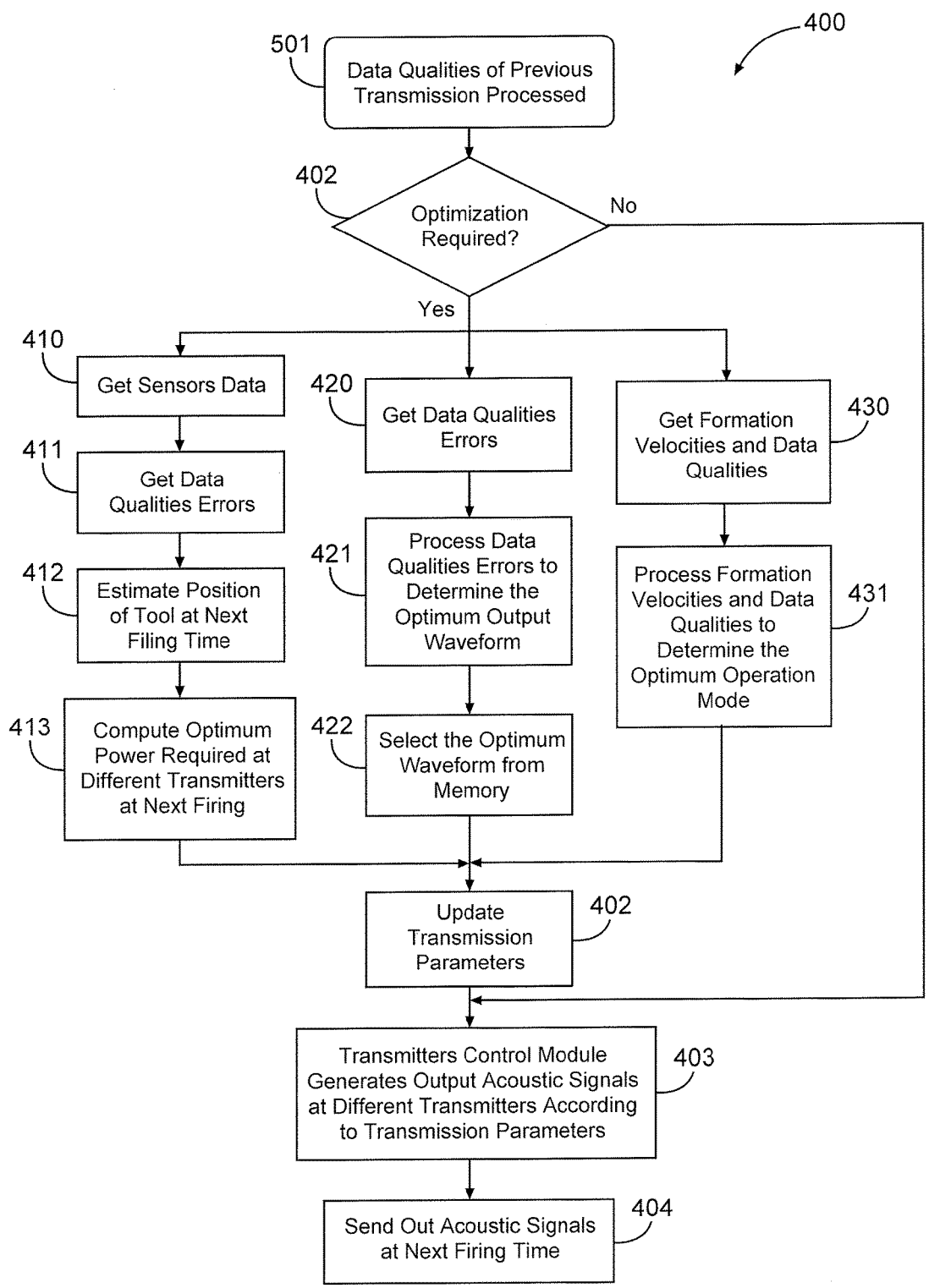
FIG. 4 is a flow chart illustrating an exemplary method of optimizing the power and frequency for the acoustic logging tool in accordance with an exemplary embodiment of the present invention.

FIG. 4 is a flow chart 400 illustrating an exemplary method of optimizing the power, mode and waveform for the acoustic logging tool in accordance with an exemplary embodiment of the present invention. Initially, the system in one embodiment will process the data qualities of the previous transmission 501 with reference to FIG. 5. The system will check if any optimization of the parameters is required 402. If no optimization is required of the next transmission, no transmission parameters will be changed and the transmitter controller module 340 will proceed to generate the same waveform and mode as the previous transmission to the transmitters driver circuit 341 which will step up the signal strength and drive it out of the different transmitters 342 at the next transmission 404.

If signal optimization is required, the transmitters control module 340 will execute the optimization process. Performing a parameter optimization includes determining the optimum power, mode, and waveform for use by the acoustic tool for the next transmission. The process of optimizing the source power, mode, and waveform are computed separately. To compute the optimum power, sensors data 410 like mud velocity, tool azimuth, caliper or standoff measurement, rate of tool rotation, and signal qualities error 411 are first taken from memory 331. As the tool is rotating, its position will change at the next transmission. Estimation of the tool position 412 at the next transmission is important at determining the optimum power as there is more signal attenuation at the transmitter side with larger standoff compared to a transmitter side with less standoff distance. Using input data of next tool position and qualities error, an optimum power required at different transmitter at next transmission can be computed 413. To compute the optimum waveform, the signal qualities errors are extracted 420 from memory 331 and processed to obtain the optimum waveform of the next transmission 421. The location of the optimum waveform in the memory 331 is selected and stored. The computation of the optimum power and waveform could be done by decision algorithms such as a fuzzy classification algorithm, artificial neural network, expert system, or lookup table with an appropriate formula taking into account all of the data inputs. This selection may be known to a person of ordinary skill in the art. To compute the optimum mode, the formation velocities and signal qualities are extracted 430 from memory 331 and processed to determine the optimum operation mode at next transmission. After the optimum power, mode and waveform are selected, the transmission parameters for the next transmission are updated to memory. The transmitter controller module 340 will proceed to generate the optimum waveform and mode to the transmitters driver circuit 341 which will step up the signal strength and drive it out of the different transmitters 342 at the next transmission 404.

The acoustic signals generated downhole may further be received and used to compute a shear velocity or a compression velocity, and/or other measurement generated by an acoustic tool. These signals may further be processed to generate formation characteristics of the downhole environment. The characteristic information regarding the downhole environment, the data from the various parameters that includes sensor data, and a determined signal qualities error, as further discussed in FIG. 5 below, may be used to generate optimum power, mode and waveform parameters for subsequent acoustic signals generation.

Figure 5:
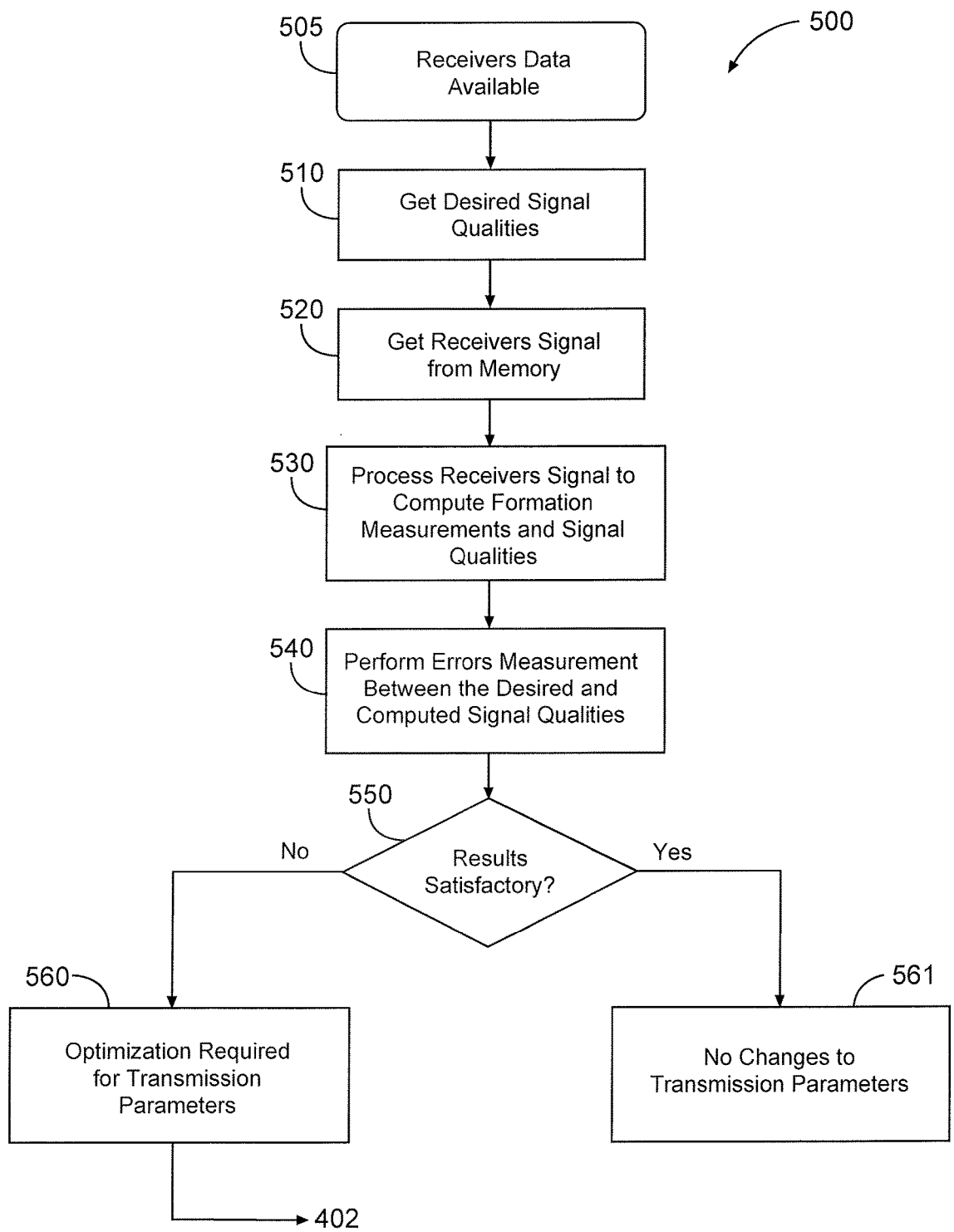
FIG. 5 is a flow chart illustrating an exemplary method of computing the signal qualities of the transmission.

FIG. 5 is a flowchart illustrating an exemplary method of computing the signal qualities of the transmission. With reference to FIG. 5 as an exemplary embodiment, the method provides obtaining the desired signal qualities 510. The desired signal qualities level may be defined by an operator or a user. The desired signal qualities 510 may be selected based on historical data, processed data, or any other metric as desired by the operator or user of the environment. The desired signal qualities 510 may also be a default value for a wellbore. The desired signal qualities 510 may include the semblance correlation value, signal to noise (SNR) ratio from different receiver arrays, availability of shear velocity, amplitude of body and surface waves, dispersion factors, measurement variance, etc. The desired signal qualities 510 may be in a metric form as some quantities are dependent and interact with each other. The method further describes receiving the acoustic signals data 520 from memory 331 generated by the process discussed in FIG. 3. The received signals waveforms may be processed 504 to interpret shear velocity, compression velocity, porosity or any other number of formation characteristics. The process further describes improving qualities of the received signal.

Once the various metrics have been processed, the method describes computing the signal qualities 540 of the signal. The signal qualities determine the likelihood that the various metrics received and processed that identify the various characteristics of the downhole formation are correct. In one embodiment, once signal qualities have been computed, the signal qualities can indicate the level of accuracy of the data is that is being measured from the formation. A goal of the present invention is to improve the signal qualities by optimizing the inputs of power, mode, and waveform that generate the acoustic signals used to detect and identify the downhole formation characteristics. The signal qualities can be computed by known signal processing techniques by a person of ordinary skill in the art. Next, the method describes performing error measurement 540 between the computed signal qualities and the desired signal qualities. If the computed signal qualities 530 are within the acceptable desired signal qualities 510 based on the error measurement 540 calculation, then the results are satisfactory 550 and the method describes not making any changes to the existing transmission parameters 561. If the computed signal qualities 530 are not within the acceptable desired signal qualities 510 based on the error measurement 540 calculation, then the results are not satisfactory 550 and a parameter optimization 400 will be required 560.

The method further discusses computing the optimum power, mode, and waveform by the transmitters control module 340 for use for the next transmission of acoustic signals. The transmitters control module 340 can further communicate the values to the transmitters driver circuit 260 which can, as discussed above, generate the signal transmission at the selected power, mode, and waveform. In this manner, the optimum power and frequency is used for the next transmission that uses the feedback from the various measurement downhole data in realtime and optimizes the acoustic tool performance. By using the optimum power, life of the tool is extended and preserved and the signal qualities are improved, thus enhancing tool measurement accuracy. This feedback process can continually occur until desired signal qualities 510 are reached and further begin or end anytime as desired by the operator or user or further variable. The method discussed herein may be computer implemented in an information handling system.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. An acoustic data transmission method for enhancing signal quality of a transmitted signal comprising:

identifying desired signal qualities;
generating a first acoustic signal generated using a first waveform, a first mode and a first power,
transmitting the first acoustic signal into a formation;
receiving the first acoustic signal at a plurality of receivers;
computing formation velocities from data extracted from the first acoustic signal;
computing signal qualities of the first acoustic signal;
identifying an error calculation between the first acoustic signal qualities and the desired signal qualities;
performing an optimization of a plurality of parameters using information from a plurality of sensors regarding formation characteristics and the formation velocities extracted from the first acoustic signal, wherein the optimization generates an optimum second waveform, an optimum second transmission mode and optimum second power;
generating a second acoustic signal using the optimum second waveform, second transmission mode and second power.

2. The method of claim 1, wherein the desired signal qualities is input by one of an operator or a user.

3. The method of claim 1, wherein the first acoustic signal results in producing a compression wave and other direct or surface waves from the formation that are acquired at the receivers.

4. The method of claim 1, wherein the first acoustic signal results in producing a shear wave from the formation that is acquired at the receivers.

5. The method of claim 1, wherein the plurality of sensors comprises one or more of density, temperature, mud velocity, pressure, azimuth, rotation velocity, standoff or viscosity.

6. The method of claim 1, wherein the information extracted from the first acoustic signal is further processed by a filtering process.

7. The method of claim 1, wherein the optimum second waveform and second power are further determined by using the error minimization methods.

8. The method of claim 1, wherein the error calculation is the difference between the signal qualities of the first acoustic signal and the desired signal qualities.

9. An adaptive acoustic transmission optimization system for enhancing signal qualities of received signals comprising:
desired signal qualities, wherein the desired signal qualities are identified by one of an operator or a user;
a first acoustic signal, wherein the first acoustic signal is generated in part using a first waveform, a first transmission mode and a first power; further wherein signal qualities of the first acoustic signal is determined;
a second acoustic signal, wherein the second acoustic signal is generated using an optimum second waveform, an optimum transmission mode and an optimum second power, wherein the optimum second waveform, the optimum second transmission mode and optimum second power are determined based on a plurality of parameters using information from a plurality of sensors and information extracted from the first acoustic signal regarding formation characteristics;
an error calculation, wherein the error calculation is identified based on the signal qualities of the first acoustic signal and the desired signal qualities.

10. The system of claim 9, wherein the desired signal qualities is input by one of an operator or a user.

11. The system of claim 9, wherein the first acoustic signal results in producing a compression wave and other direct or surface waves from the formation that are acquired at the receivers.

12. The system of claim 9, wherein the first acoustic signal results in producing a shear wave from the formation that is acquired at the receivers.

13. The system of claim 9, wherein the plurality of sensors comprises one or more of density, temperature, mud velocity, pressure, azimuth, rotation velocity, standoff or viscosity.

14. The system of claim 9, wherein the information extracted from the first acoustic signal is further processed by a filtering process.

15. The system of claim 9, wherein the error calculation is the difference between the signal qualities of the first acoustic signal and the desired signal qualities.

16. A system for transmitting an acoustic signal at an optimum signal quality for an acoustic transmission, the system comprising
desired signal qualities, wherein the desired signal qualities are identified by one of an operator or a user;
a first acoustic signal, wherein the first acoustic signal is generated in part using a first waveform, a first transmission mode and a first power; further wherein signal qualities of the first acoustic signal is determined;
a second acoustic signal, wherein the second acoustic signal is generated using an optimum second waveform, optimum second transmission mode and an optimum second power, wherein the optimum second waveform and optimum second power are determined based on a plurality of parameters using information from a plurality of sensors and information extracted from the first acoustic signal regarding formation characteristics;
an error calculation, wherein the error calculation is identified based on the signal qualities of the first acoustic signal and the desired signal qualities.

17. The system of claim 16, wherein the desired signal qualities is input by one of an operator or a user.

18. The system of claim 16, wherein the first acoustic signal results in producing a compression wave and other direct or surface waves from the formation that are acquired at the receivers.

19. The system of claim 16, wherein the first acoustic signal results in producing a shear wave from the formation that is acquired at the receivers.

20. The system of claim 16, wherein the plurality of sensors comprises one or more of density, temperature, mud velocity, pressure, azimuth, rotation velocity, standoff or viscosity.

21. The system of claim 16, wherein the information extracted from the first acoustic signal is further processed by a filtering process.

* * * * *